US009934150B1

(12) United States Patent
Gautam et al.

(10) Patent No.: US 9,934,150 B1
(45) Date of Patent: Apr. 3, 2018

(54) DATA CACHING CIRCUIT AND METHOD

(71) Applicant: Marvell International Ltd., Hamilton (BM)

(72) Inventors: Viney Gautam, San Jose, CA (US); Yicheng Guo, Milpitas, CA (US); Hunglin Hsu, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/278,308

(22) Filed: Sep. 28, 2016

Related U.S. Application Data

(60) Provisional application No. 62/244,445, filed on Oct. 21, 2015.

(51) Int. Cl.
| | | |
|---|---|---|
| *G06F 12/08* | (2016.01) | |
| *G06F 12/10* | (2016.01) | |
| *G06F 12/0864* | (2016.01) | |
| *G06F 12/0895* | (2016.01) | |
| *G06F 12/1045* | (2016.01) | |

(52) U.S. Cl.
CPC ...... *G06F 12/0864* (2013.01); *G06F 12/0895* (2013.01); *G06F 12/1063* (2013.01); *G06F 2212/1028* (2013.01); *G06F 2212/152* (2013.01)

(58) Field of Classification Search
None
See application file for complete search history.

(56) References Cited

U.S. PATENT DOCUMENTS

| | | | | |
|---|---|---|---|---|
| 6,598,118 B1* | 7/2003 | Arimilli | ............ | G06F 12/0864 |
| | | | | 711/119 |
| 8,990,505 B1* | 3/2015 | Jamil | ................. | G06F 12/0864 |
| | | | | 711/128 |
| 2006/0047884 A1* | 3/2006 | Tran | .................... | G06F 12/0864 |
| | | | | 711/3 |
| 2006/0047912 A1* | 3/2006 | Chinnakonda | ........ | G06F 9/3824 |
| | | | | 711/128 |
| 2007/0028047 A1* | 2/2007 | Williamson | ........ | G06F 12/0864 |
| | | | | 711/118 |
| 2014/0173193 A1* | 6/2014 | Fahs | ................... | G06F 12/1027 |
| | | | | 711/108 |

\* cited by examiner

*Primary Examiner* — Edward J Dudek, Jr.
*Assistant Examiner* — Ralph A Verderamo, III

(57) ABSTRACT

A circuit has an address generation circuit to produce a virtual address (VA) and an index signal and a multi-way cache circuit. The cache circuit has a plurality of Random Access Memory (RAM) groups and a hash function circuit to generate a hash output from the VA. Each RAM group includes RAMs respectively corresponding to the ways. The cache circuit selects, using the hash output, a selected RAM group of the RAM groups, and performs, using the index signal as an address, an operation using one or more RAMs of the selected RAM group. Controlling a multi-way cache circuit comprises determining a hash value using a VA, selecting, using the hash value, a RAM group from a plurality of RAM groups, and performing an operation by using one or more RAMs of the selected RAM group. The RAMs of each RAM group respectively correspond to the ways.

20 Claims, 7 Drawing Sheets

DATA CACHING CIRCUIT AND METHOD

CROSS REFERENCE TO RELATED APPLICATION

This present disclosure claims the benefit of U.S. Provisional Application No. 62/244,445, filed on Oct. 21, 2015, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In the description that follows, "byte" refers to an octet, that is, to 8 binary digits (bits). The term "kilobyte" and the abbreviation "KB" both refer to 1024 bytes.

In a computer processor, a cache memory circuit (hereinafter, a cache) may be used to store data corresponding to a location in a main memory. The cache is typically smaller, has lower latency, and has higher bandwidth than the main memory.

The cache may include a plurality of tags respectively associated with a plurality of memory elements that store data (hereinafter, cache lines). The cache compares an address of a memory operation with an address stored in a tag to determine whether the cache line associated with the tag corresponds to the location indicated by the address of the memory operation, that is, whether the location indicated by the address of the memory operation is cached.

A set-associative cache may only check one of a plurality of sets of the cache when determining whether a location is cached. The set-associative cache determines which set to check using bits of the address of the memory operation. For example, in a set-associative cache having 256-byte cache lines and 256 sets, the set to check may be determined using bits 15 through 8 of the address of the memory location (with bits 7 through 0 indicating particular bytes within the 256-byte cache lines). In this example, bits 15 to 8 correspond to a set address, referred to herein as an index.

A set-associate cache may have a plurality of ways. A cache having a plurality of ways may be referred to as a multi-way cache. The number of ways indicates the number of distinct locations in the cache that may correspond to any one memory location.

Caches may be used in processors having virtual memory architectures. In a virtual memory architecture, virtual addresses are generated by the processor and are then translated by a Memory Management Unit (MMU) into physical addresses. In a typical MMU, memory addresses are translated in pages. For example, in an MMU using 4 KB pages, each 4 KB page in the virtual memory space may be mapped to a 4 KB page in the physical address space. A location at an offset within the virtual memory page will be located at the same offset within the corresponding physical address page. The MMU may include a Translation Lookaside Buffer (TLB) to decrease the amount of time required to perform the address translation.

A Physically Indexed and Physically Tagged (PIPT) cache may determine the set address using a physical address and compare the physical address to the one or more tags in the set indicated by the set address. As a result, in a PIPT cache the physical address is determined before the data cache can be accessed.

To reduce a latency of load operations, the cache may begin a process of retrieving data before the physical address of the data is fully known. In particular, a virtually indexed, physically tagged (VIPT) cache may begin the process of retrieving data before the MMU completes an address translation between a virtual address and a physical address.

The VIPT cache is a set-associative cache that uses a plurality of bits of the virtual address as the set address, that is, the VIPT cache uses a virtual set address (VSA) as an index of the cache. Once the index has been determined, the VIPT cache compares a plurality of bits of the physical address against the tags in the set corresponding to the index to determine whether the VIPT cache includes a cache line corresponding to the memory location specified by the physical address. Because virtual indexing is limited by the minimum translation page size supported by the instruction set architecture, the VIPT cache may require more associativity than a PIPT cache.

A VIPT cache may perform serial access of its tag and data SRAMs. In such a serial-access VIPT cache, a Virtual Address is used to generate the index used to access both data and tag SRAM banks, with the data SRAM banks being accessed after the tag SRAM banks.

Another VIPT cache may perform parallel access of its tag and data SRAMs. Such a parallel-access VIPT cache is similar to the serial-access VIPT cache, except that the data and tag SRAMs are accessed in parallel, which can result in lower data latency than the serial-access VIPT cache.

The use of a parallel-access VIPT cache may reduce data access latency but may also increase power dissipation. The power dissipation may increase because the parallel-access VIPT cache reads data from all the ways of the data SRAM, as a result of not knowing which way includes the requested data at the time the data SRAM is read.

SUMMARY

Embodiments relate to reducing power dissipation in parallel-access Virtually-Index Physically-Tagged (VIPT) caches.

In an embodiment, a circuit comprises an address generation circuit to produce a virtual address and an index signal, and a cache circuit. The cache circuit has a plurality of ways, and includes a plurality of Random Access Memory (RAM) groups and a hash function circuit to generate a hash output signal according to the virtual address. Each RAM group includes a plurality of RAMs which respectively correspond to the ways of the cache. The cache circuit is configured to i) select, using a value of the hash output signal, a selected RAM group of the plurality of RAM groups, and ii) perform, using a value of the index signal as an address, an operation using one or more of the RAMs of the selected RAM group.

In an embodiment, a method performed for controlling a cache circuit having a plurality of ways comprises i) determining, using a hash function circuit, a hash value corresponding to a virtual address, ii) selecting, using the hash value, a selected RAM group from a plurality of RAM groups, each RAM group including a plurality of RAMs, and iii) performing an operation by using one or more RAMs of the selected RAM group. The RAMs of the RAM groups respectively correspond to the ways.

DETAILED DESCRIPTION

Figure 1:
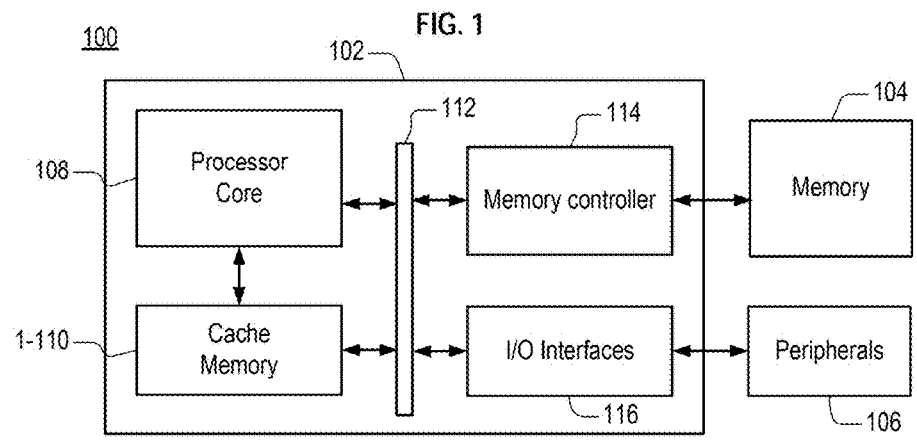
FIG. 1 illustrates an electronic system, according to an embodiment.

FIG. 1 illustrates an electronic system 100 according to an embodiment of the present disclosure. The electronic system 100 includes a computer processor 102, an electronic storage circuit (hereinafter, a memory) 104, and one or more peripherals 106. In an embodiment, the electronic system 100 is a System-on-a-Chip (SoC).

The computer processor 102 includes a processor core 108, a cache memory circuit (hereinafter, a cache) 1-110, a bus 112, a memory controller 114, and one or more Input/Output (I/O) interfaces 116. In an embodiment, the computer processor 102 is a System-on-a-Chip (SoC).

The processor 108 performs functions of the electronic system 100 by executing computer programming instructions retrieved from a non-transient computer-readable media, such as one or more of the cache 1-110 and the memory 104. The processor 108 may read, write, and manipulate data stored in one or more of the cache 1-110, the memory 104, and the I/O interfaces 116.

Although the processor core 108 is described herein as a processor, embodiments are not limited thereto. In an embodiment, the processor core 108 may be a programmable Graphics Processing Unit (GPU) or other type of semiconductor circuit that executes instructions, manipulates data, or both, where the instructions, data, or both are stored in the memory 104, the cache memory 1-110, or both.

A memory controller 114 of the computer processor 102 is coupled to the memory 104 and operates to store information in the memory 104 (that is, to write to the memory 104) and to retrieve information stored in the memory 104 (that is, to read from the memory 104). The information may include data, computer programming instructions, or both.

The memory 104 includes a non-transient computer readable medium, including one or more of a Read-Only Memory (ROM), a volatile Random Access Memory (RAM), and a non-volatile memory. The ROM may include one or more of a Programmable ROM (PROM), an Erasable Programmable ROM (EPROM), and the like. The RAM may include one or more of a Static RAM (SRAM), a Dynamic RAM (DRAM), and the like. The non-volatile memory may include one or more of an Electrically Erasable Programmable ROM (EEPROM), a Flash memory, a phase-change memory, and the like.

The memory 104 may also include one more outer-level caches. For example, when the cache 1-110 is a first level cache, the memory 104 may include one or more of a second level cache, a third level cache, and so on.

The I/O interfaces 116 may include one or more of a serial digital interface, a parallel digital interface, an analog interface, a network interface, and the like. Each of the I/O interfaces 116 may be an input interface, and output interface, or a bidirectional interface. The I/O interfaces 116 may also include one or more bus interfaces, such as a Peripheral Component Interconnect (PCI) bus interface, a PCI eXtended (PCI-X) bus interface, an Inter-Integrated Circuit (I2C) bus interface, and the like.

The I/O interfaces 116 provide communication, control, or both for the peripherals 106. The peripherals 106 may include mass storage devices (e.g., one or more of an optical disc drive, a hard disc drive, a solid state disc, and the like), network interfaces (e.g. one or more of an Ethernet® adapter, a Wireless Local Area Network (WLAN) adapter, a Personal Area Network (PAN) adapter, and the like), a display adapter, a camera, a sensor, an actuator, and the like. The I/O interfaces 116 may include Direct Memory Access (DMA) devices.

The bus 112 provides communications between the processor core 108, the memory controller 114, and the I/O interfaces 116. In the embodiment shown in FIG. 1, the bus 112 also provides communications between the cache 1-110 and the memory controller 114. In another embodiment, the cache 1-110 may be coupled to the memory controller 114 through a dedicated point-to-point connection.

The cache 1-110 provides information corresponding to memory locations in the memory 104 to the processor core 108. The cache 1-110 provides the information with a lower latency, a higher bandwidth, or both than the memory 104 is capable of.

Although the cache 1-110 as described herein is a first-level cache, embodiments are not limited thereto. In an embodiment, the cache 1-110 may be any of a second-level cache, a third-level cache, and so on.

The cache 1-110 may be a Physically-Indexed Physically-Tagged (PIPT) cache, a serial-access Virtually-Indexed Physically-Tagged (VIPT) cache, or a parallel-access VIPT cache. In an illustrative embodiment, the cache 1-110 may have a memory size of 32 KB to 64 KB and a clock frequency of 2 GHz.

When the cache 1-110 is a PIPT cache, the cache 1-110 may require 4 cycles to read data from the PIPT cache and align the data. A first cycle may be used to generate a Virtual Address. A second cycle may be used to translate, using a TLB, the Virtual Address into a Physical Address. In a third cycle, the Physical Address may be sent to the PIPT cache, which uses the Physical Address to generate an index, and which access the data and tag Static Random Access Memories (SRAMs) using the index. A fourth cycle may be used to read the data from data SRAMs, mux out relevant tag hit data and align it to a least significant byte or bit.

When the cache 1-110 is a serial-access VIPT cache, the cache 1-110 may require 5 cycles to read data from the cache and align the data. A Virtual Address is generated during a first cycle. During a second cycle, the Virtual Address may be translated, using a TLB, into a Physical Address, and the cache 1-110 may generate an index using the Virtual Address and read the tag SRAMs using the index. During a third cycle, the cache 1-110 may generate cache hit information such as which way(s) the address hits (HitWay). During a fourth cycle, the cache 1-110 may read, using HitWay, data from a data SRAM. During a fifth cycle the VIPT cache may read out requested data and align it to a least significant byte.

When the cache 1-110 is a parallel-access VIPT cache, the cache 1-110 may require 3 cycles to read data from the cache and align the data. A Virtual Address is generated during a first cycle. During a second cycle, the Virtual Address may be translated, using a TLB, into a Physical Address, and the cache 1-110 may generate an index using the Virtual Address, read the tag SRAM using the index, and read the data SRAM using the index. During the third cycle, the cache 1-110 may generate cache hit information such as HitWay, select, using the cache hit information, requested data from data read out of the data SRAMs, and align the data to the least significant byte.

Figure 2:
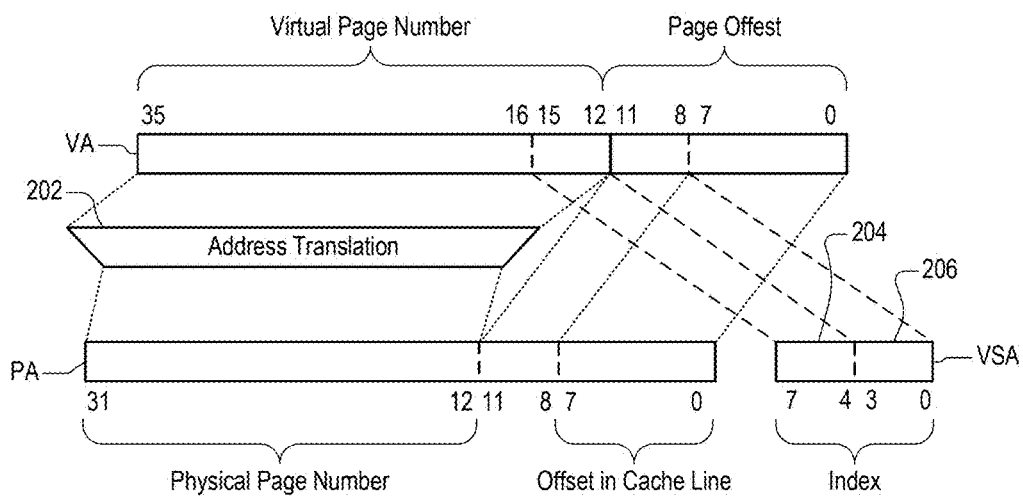
FIG. 2 illustrates a virtual memory address architecture, according to an embodiment.

FIG. 2 illustrates a virtual memory address architecture according to an illustrative embodiment. The virtual memory address architecture translates a 36-bit virtual address VA into a 32-bit physical address PA. Also illustrated is an index or Virtual Set Address (VSA) according to the VA. Embodiments are not limited to the details of the virtual memory address architecture shown in FIG. 2.

In the example of FIG. 2, the 24 most significant bits (MSBs) (bits 35 to 12) correspond to a virtual page number. The 12 least significant bits (LSBs) (bits 11 to 0) of the VA correspond to a page offset, indicating an offset within a page of memory, and corresponding to a page size of 4 kilobytes (KB).

The 12 least significant bits (LSBs) (bits 11 to 0) of the PA also correspond to a page offset. The page offset of the VA is identical to the page offset of the PA, that is, the bits corresponding to the page offset are invariant bits in the memory translation.

The virtual page number of the VA is translated, using an address translation process 202, to a physical page number. The physical page number corresponds to the 20 MSBs (bits 31 to 12) of the PA. In an embodiment, the address translation process 202 is performed using an address translation circuit including a Translation Look-aside Buffer (TLB).

The example of FIG. 2 also illustrates aspects of an operation of a Virtually-Indexed, Physically Tagged (VIPT) cache. In the example of FIG. 2, the VIPT cache includes 256-byte cache lines. Therefore, bits 7 to 0 of the page offset correspond to an offset within the cache lines of the VIPT cache.

In the example of FIG. 2, the VIPT cache includes 256 sets, corresponding to 64 KB per way of the VIPT cache. Accordingly, bits 15 to 8 of the VA are used as the index VSA.

Bits 3 to 0 of the index VSA comprise invariant bits 206, and correspond to bits 11 to 8 of the VA, which are invariant bits within the page offset. Bits 7 to 4 of the index VSA comprise non-invariant bits 204, and correspond to bits 15 to 12 of the VA, which are not invariant bits, and as a result cache aliasing may occur in the VIPT cache.

Figure 3:
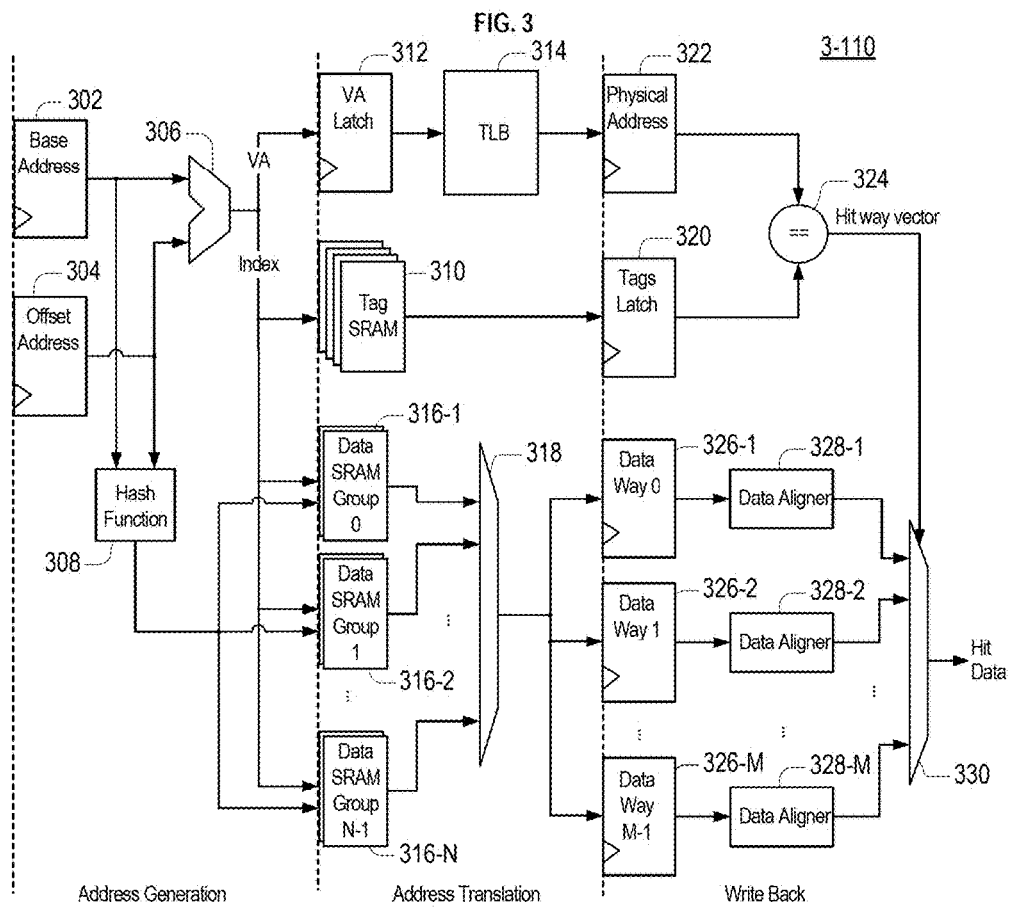
FIG. 3 is a pipeline diagram of a parallel-access VIPT cache, according to an embodiment.

FIG. 3 is a pipeline diagram of a parallel-access VIPT cache 3-110, according to an embodiment. The parallel-access VIPT cache 3-110 may be included in the cache 1-110 of FIG. 1. In FIG. 3, a box with a triangular clock-input symbol, such as the Base Address latch 116, may correspond to a pipeline latch of the parallel-access VIPT cache 3-110.

The parallel-access VIPT cache 3-110 includes a base address latch 302, an offset address latch 304, an Address Generation Unit (AGU) 306, and a hash function circuit 308.

The base address latch 302 and the offset address latch 304 receive and latch a base address value and an offset address value, respectively, from a previous pipeline stage, which may include a pipeline stage of a processor core such as the processor core 108 of FIG. 1.

The AGU 306 determines a Virtual Address (VA) according to the value latched in the base address latch 302 and the offset address latch 304. The AGU 306 may include one or more of adder circuits, shifter circuits, masking circuits, and the like. In an embodiment, the AGU 306 determines the VA by adding the value latched in the offset address latch 304 to the value latched in the base address latch 302. In another embodiment, the AGU 306 determines the VA by shifting the value latched in the offset address latch 304 by one or more bits and adding the shifted value to the value latched in the base address latch 302.

In an embodiment, the hash function circuit 308 computes a hash value using the value latched in the offset address latch 304 and the value latched in the base address latch 302. In another embodiment, the hash function circuit 308 computes a hash value using bits of the VA. The hash function circuit 308 outputs a hash output signal having the hash value.

In an embodiment, an output signal of the hash function circuit 308 may be determined using bits of the Virtual Page Number of the VA that are not included in the index. For example, in an embodiment according to the virtual memory address architecture of FIG. 2, the value of the hash output signal produced by the hash function circuit 308 may be determined using one or more of bits 16 to 35 of the VA. In an embodiment, the hash function circuit 308 may determine the value of the hash output signal by performing an exclusive-or (XOR) operation on two or more bits of the VA. The hash function implemented by the hash function circuit 308 is to distribute memory accesses with different Virtual Page Numbers pseudo-randomly but evenly into each group. Using more bits as inputs of the hash function would produce a better distribution. However, in an embodiment, due to timing restrictions only 2 to 4 bits are used by the hash function circuit 308 to generate the hash output signal, which provides nearly optimal results.

The hash output signal may include one or more group select signals. For example, in an embodiment wherein the parallel-access VIPT cache 3-110 partitions the ways of the cache into two groups, the hash output signal may include a group select signal having one of a first value (for example, a value of zero) indicating that the first group is to be selected and a second value (for example, a value of one) indicating that the second group is to be selected.

In another embodiment wherein the parallel-access VIPT cache 3-110 partitions the ways of the cache into first to fourth groups, the hash output signal may include a group select signal corresponding to two bits and having one of first to fourth values (for example, 00, 01, 10, and 11) respectively indicating that the first to fourth groups are to be selected.

In another embodiment wherein the parallel-access VIPT cache 3-110 partitions the ways of the cache into first to fourth groups, the hash output signal may include a group select signal corresponding to four one-hot bits and having one of first to fourth values (for example, 0001, 0010, 0100, and 1000) respectively indicating that the first to fourth groups are to be selected.

For a particular VA, the same group may always be selected. The selected group may be used when reading data from or writing data to the parallel-access VIPT cache 3-110, and also when filling a memory block into the parallel-access VIPT cache 3-110.

The AGU 306 and hash function circuit 308 may operate in a first cycle of a memory operation that accesses the parallel-access VIPT cache 3-110.

The parallel-access VIPT cache 3-110 further includes a plurality of Tag SRAMs 310, a Virtual Address (VA) latch 312, and a Translation Look-aside Buffer (TLB) 314. The Tag SRAMs 310 and the TLB 314 may operate in a second cycle of the memory operation that accesses the parallel-access VIPT cache 3-110.

The plurality of Tag SRAMs 310 may include respective Tag SRAMs corresponding to ways of the parallel-access VIPT cache 3-110. The Tag SRAMs 310 respectively provide, using a value of an index corresponding to a plurality of bits of the VA determined by the AGU 306, a tag entry. As a result, the plurality of Tag SRAMs 310 produces a plurality of tag entries corresponding to respective ways of the parallel-access VIPT cache 3-110. In an embodiment, the Tag SRAMs 310 receive the first plurality of the bits of the VA from the VA latch 312.

A tag entry may include a physical address tag and a validity indication. In an embodiment, the tag entry may also include one or more of information for maintaining cache coherency and consistency, information for use in implementing a replacement policy, and the like.

The VA latch 312 receives the VA from the AGU 306 and latches the VA to produce an latched VA signal.

The TLB 314 receives the latched VA signal and translates the VA into a corresponding Physical Address (PA). Although FIG. 3 shows the TLB 314 performing the address translation, embodiments are not limited thereto, and any of a number of address translation circuits and methods known in the related arts may be used instead of or in conjunction with the TLB 314.

The parallel-access VIPT cache 3-110 further includes first to Nth Data SRAM groups 316-1, 316-2 . . . 316-N, N≥2. The data SRAMs in the SRAM groups 316-1, 316-2 . . . 316-N correspond to respective ways of the parallel-access VIPT cache 3-110. The Data SRAM groups 316-1, 316-2 . . . 316-N may operate in a second cycle of the memory operation that accesses the parallel-access VIPT cache 3-110.

The number of Data SRAM groups corresponds to the number of groups that the ways of the parallel-access VIPT cache 3-110 are partitioned into by the hash function circuit 308. The number of data SRAMs in each group corresponds to the number of ways of the parallel-access VIPT cache 3-110 divided by the number of groups that the ways of the parallel-access VIPT cache 3-110 are partitioned into, and may be indicated by ways per group value M.

For example, when the parallel-access VIPT cache 3-110 has 8 ways and the hash function circuit 308 partitions the ways into two groups, the parallel-access VIPT cache 3-110 includes first and second data SRAM groups 316-1 and 316-2 each including 4 data SRAMs.

In another example, when the parallel-access VIPT cache 3-110 has 8 ways and the hash function circuit 308 partitions the ways into four groups, the parallel-access VIPT cache 3-110 includes a first, second, third, and fourth data SRAM groups 316-1, 316-2 . . . 316-4 each including 2 data SRAMs.

In another example, when the parallel-access VIPT cache 3-110 has 6 ways and the hash function circuit 308 partitions the ways into two groups, the parallel-access VIPT cache 3-110 includes a first and second data SRAM groups 316-1, 316-2 . . . 316-4 each including 3 data SRAMs.

Only the Data SRAMs of the Data SRAM groups 316-1, 316-2 . . . 316-N that are selected according to a value of the output of the hash function circuit 308 may be read by parallel-access VIPT cache 3-110. The Data SRAMs of the selected data SRAM group are read, using the value of the index as an address, to produce respective cache lines. Data SRAMs of Data SRAM groups that are not selected according to the value of the output of the hash function circuit 308 may not be read in order to reduce power consumption.

For example, when the parallel-access VIPT cache 3-110 has first to fourth Data SRAM groups 316-1, 316-2 . . . 316-4 (N=4) and 16 ways, each of the Data SRAM groups 316-1, 316-2 . . . 316-4 includes four data SRAMs (i.e., M=4). When the hash output signal produced by the hash function circuit 308 indicates that the second data SRAM group 316-2 is selected, first to fourth cache lines corresponding to the value of the index are respectively read from the four data SRAMs of the second data SRAM group 316-2, and no cache lines may be read in parallel from the data SRAMs of the first, third, and fourth Data SRAM group 316-1, 316-2, and 316-4.

In another example, when the parallel-access VIPT cache 3-110 has first to fourth Data SRAM groups 316-1, 316-2 . . . 316-4 (N=4) and 8 ways, each of the Data SRAM groups 316-1, 316-2 . . . 316-4 includes two data SRAMs (i.e. M=2). When the hash output signal indicates that the first data SRAM group 316-1 is selected, first and second cache lines corresponding to the value of the index are respectively read in parallel from the two data SRAMs of the first data SRAM group 316-1, and no cache lines may be read from the data SRAMs of the second to fourth Data SRAM group 316-2 to 316-4.

In another example, when the parallel-access VIPT cache 3-110 has first and second Data SRAM groups 316-1 an 316-2 (N=2) and 6 ways, each of the Data SRAM groups 316-1 and 316-2 includes three data SRAMs (i.e. M=3). When the hash output signal indicates that the first data SRAM group 316-1 is selected, first to third cache lines corresponding to the value of the index are respectively read in parallel from the three data SRAMs of the first data SRAM group 316-1, and no cache lines may be read from the data SRAMs of the second Data SRAM group 316-2.

Thus, as a result of partitioning the data SRAMs into groups, a number of data SRAMs that are read out in parallel for a memory access may be reduced.

A first multiplexer circuit 318 produces an output by selecting, according to the hash output signal, the cache lines read out of the selected data DRAM group.

The parallel-access VIPT cache 3-110 further includes a Physical Address (PA) latch 322, a tags latch 320, and a hit determination circuit 324. The hit determination circuit 324 may operate in a third cycle of the memory operation that accesses the parallel-access VIPT cache 3-110.

The PA latch 322 receives the PA from the TLB 314 and latches the result to produce a latched PA signal. The tags latch 320 receives the plurality of tags entries produced by the tag SRAM 310 to produce a plurality of latched tag entries signal.

The hit determination circuit 324 compares a value of the latched PA signal to respective values of the plurality of latched tag entries signal to produce a hit way vector. In an embodiment, the hit way vector includes bits respectively corresponding to the ways of the cache.

In an embodiment, for each way of the cache, the hit determination circuit 324 respectively sets a corresponding bit in the hit way vector to a predetermined hit value (for example, a one) when the corresponding latched tag entries signal is indicated as valid and has a tag value equal to a plurality of bits of the latched PA signal, and sets the bits to a predetermined miss value (for example, 0) otherwise.

The parallel-access VIPT cache 3-110 further includes a plurality of data way latches 326-1, 326-2 . . . 326-M and a plurality of data aligners 328-1, 328-2 . . . 328-M, where M is equal to the number of ways per group of the parallel-access VIPT cache 3-110. The parallel-access VIPT cache 3-110 further includes a second multiplexer circuit 330. The data aligners 328-1, 328-2 . . . 328-M and second multiplexer 330 may operate in the third cycle of the memory operation that accesses the parallel-access VIPT cache 3-110.

The data way latches 326-1, 326-2 . . . 326-M respectively receive the cache lines output by the data SRAMs of the selected Data SRAM group and latch the cache lines to produce a plurality of latched cache line signals. For example, when the first Data SRAM group 316-1 is the selected Data SRAM group and includes first to fourth data SRAMs, the first to fourth data way latches 326-1, 326-2 . . . 326-M (M=4) respectively latch the cache line output by the first to fourth data SRAMs of the first Data SRAM group 316-1.

The data aligners 328-1, 328-2 . . . 328-M respectively receive the latched cache line signals and align them according to one or more less-significant bits of the latched PA signal to produce a plurality of aligned cache lines.

The second multiplexer 330 selects an aligned cache line of the plurality of aligned cache lines according to values of the bits in the hit way vector. When the hit way vector does not have a bit that has the predetermined hit value, an aligned cache line is not selected and a cache miss is indicated.

When only one bit of the hit way vector has the predetermined hit value and the bit with the predetermined hit value corresponds to one way of the selected Data SRAM group, the aligned cache line corresponding to the way is selected and a cache hit is indicated. For example, in a cache having 8 ways partitioned into two Data SRAM groups, the first Data SRAM group 316-1 including the first to fourth way and the second Data SRAM group 316-2 including the fifth through eighth ways, when the first Data SRAM group 316-1 is selected and a bit of the hit way vector corresponding to the third way has the predetermined hit value, the second multiplexer 330 selected an aligned cache line corresponding to the third data SRAM of the first Data SRAM group 316-1. In the same cache, when the second Data SRAM group 316-2 is selected and a bit of the hit way vector corresponding to the sixth way has the predetermined hit value, the second multiplexer 330 selected an aligned cache line corresponding to the second data SRAM of the second Data SRAM group 316-2.

In some VIPT caches, a physical memory location may be mapped by two different virtual memory locations, and memory aliasing may occur. When memory aliasing occurs, a first access to a given physical address performed using a first virtual address may result in the information corresponding to the given physical address being stored in one Data SRAM group. A second access to a given physical address performed using a second virtual address may result in the information corresponding to the given physical address being stored in an another Data SRAM group. Experiment results have demonstrated that such memory aliasing is not common, especially for single thread CPU/GPUs.

In the parallel-access VIPT cache 3-110, memory aliasing may be detected when a bit of the hit way vector corresponding to a way not in the selected Data SRAM group has the predetermined hit value, or when more than one bit in the hit way vector has the predetermined hit value.

In an embodiment, when memory aliasing is detected, a second read operation may be performed to read a cache line from a data SRAM of a Data SRAM group other than the selected Data SRAM group, the cache line corresponding to the way that corresponds to the bit of the hit way vector having the predetermined hit value.

In another embodiment, when memory aliasing is detected, the data corresponding to the physical address that is in the Data SRAM group other than the selected Data SRAM group is evicted from the data cache and a fill operation is then performed to cache the data corresponding to the physical address in a way corresponding to a data SRAM of the selected Data SRAM Group.

Figure 4:
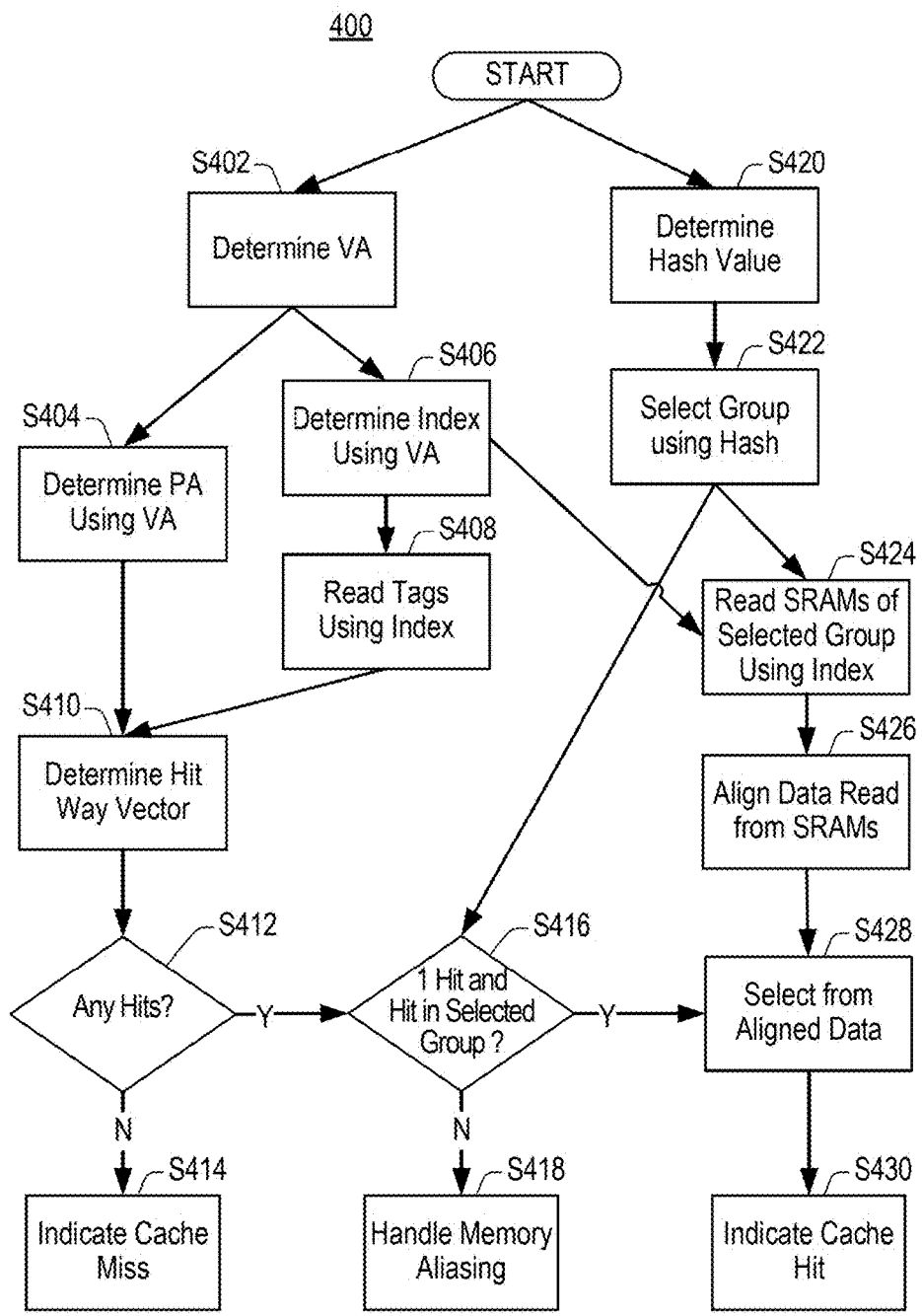
FIG. 4 illustrates a process for reading from a cache, according to an embodiment.

FIG. 4 illustrates a process 400 for reading from a parallel-access VIPT cache according to an embodiment. As shown in FIG. 4, some operations of the process 400 may be performed in parallel with other operations of the process 400. For example, operations of S420 to S426 may be performed in parallel with operations of S402 to S416, and operations of S406 and S408 may be performed in parallel with operation of S404.

In FIGS. 4-10, arrows represent dependencies, for example, one or more of a data dependency, a control dependency, and so on. In an embodiment, when one or more arrows respectively point from one or more first blocks to a second block, the operations corresponding to the second block may be performed after operations in the one or more first blocks are performed.

At S402, the process 400 determines a Virtual Address (VA). The VA may be determined, for example, by adding a base address to an offset. The result of this addition may be the VA.

At S404, the process 400 determines a Physical Address (PA) using the VA. In an embodiment, the PA may determine from the VA using a Memory Management Unit (MMU). The MMU may include one or more of a Translation Look-aside Buffer (TLB) circuit, a page table tree walker circuit, and so on.

At S406, the process 400 determines an index using the VA. In an embodiment, the index may include a plurality of least significant bits (LSBs) of the VA.

At S408, the process 400 reads, using the index, a plurality of tag entries from a tag RAM. The tag entries respectively correspond to the ways of the cache. For example, when the cache has 8 ways, the process 400 reads 8 tag entries from the cache.

At S410, the process 400 determines a hit way vector using the PA and the plurality of tag entries. Bits of the hit way vector respectively corresponds to ways of the cache. In an embodiment, when a tag entry is indicated as valid and a tag value of the tag entry is equal to corresponding bits in the PA, the corresponding bit of the hit way vector is set to a predetermined hit value (for example, 1). Otherwise the corresponding bit of the hit way vector is set to a predetermined miss value (for example, 0).

At S412, the process 400 determines whether any of the bits of the hit way vector have the predetermined hit value. When at least one bit has the predetermined hit value, the process 400 proceeds to S416. Otherwise, at S412 the process 400 proceeds to S414.

At S414, the process 400 indicates the a cache miss has occurred.

In an embodiment, the process 400 may perform a fill process, such as the process 600 of FIG. 6, below, when a cache miss occurs. After performing the fill process, the process 400 may restart.

At S416, the process 400 determines whether memory aliasing has occurred. In an embodiment, memory aliasing occurs when a bit in the hit way vector corresponding to a way in a group other the selected group (selected at S422) has the predetermined hit value, or when more than one bit in the hit way vector has the predetermined hit value. When only one bit of the hit way vector has the predetermined hit value and the one bit corresponds to a way that is in the selected group, memory aliasing has not occurred, and the process 400 proceeds to S428. Otherwise, at S416 the process 400 proceeds to S418.

At S418, the process 400 handles the memory aliasing. The process 400 may handle the memory aliasing using, for example, the process 700 of FIG. 7 or the process 800 of FIG. 8, but embodiments are not limited thereto.

At S420, the process 400 determines a hash value. The hash value may be one of a plurality of values respectively corresponding to a group of ways of the cache. In an embodiment, the hash value is a function of the VA. In an embodiment, the hash value corresponds to a result of performing an exclusive-or (XOR) operation on a plurality of bits of the VA. In an embodiment, the bits of the VA are bits other than bits used in the index.

At S422, the process 400 selects a group using the hash value.

At S424, the process 400 reads a plurality of cache lines from respective ways of the selected group. In an embodiment, the ways of the groups correspond to respective data RAMs of the group.

At S426, the process 400 aligns the plurality of cache lines according to one or more bits of the PA or one or more bits of the VA, to produce a respective plurality of aligned cache lines.

At S428, the process 400 selects an aligned cache line from the plurality of aligned cache lines according to the hit way vector. The process 400 selects an aligned cache line corresponding to a bit of the hit way vector that has the predetermined hit value.

At S430, the process 400 indicates that a cache hit has occurred.

Figure 5:
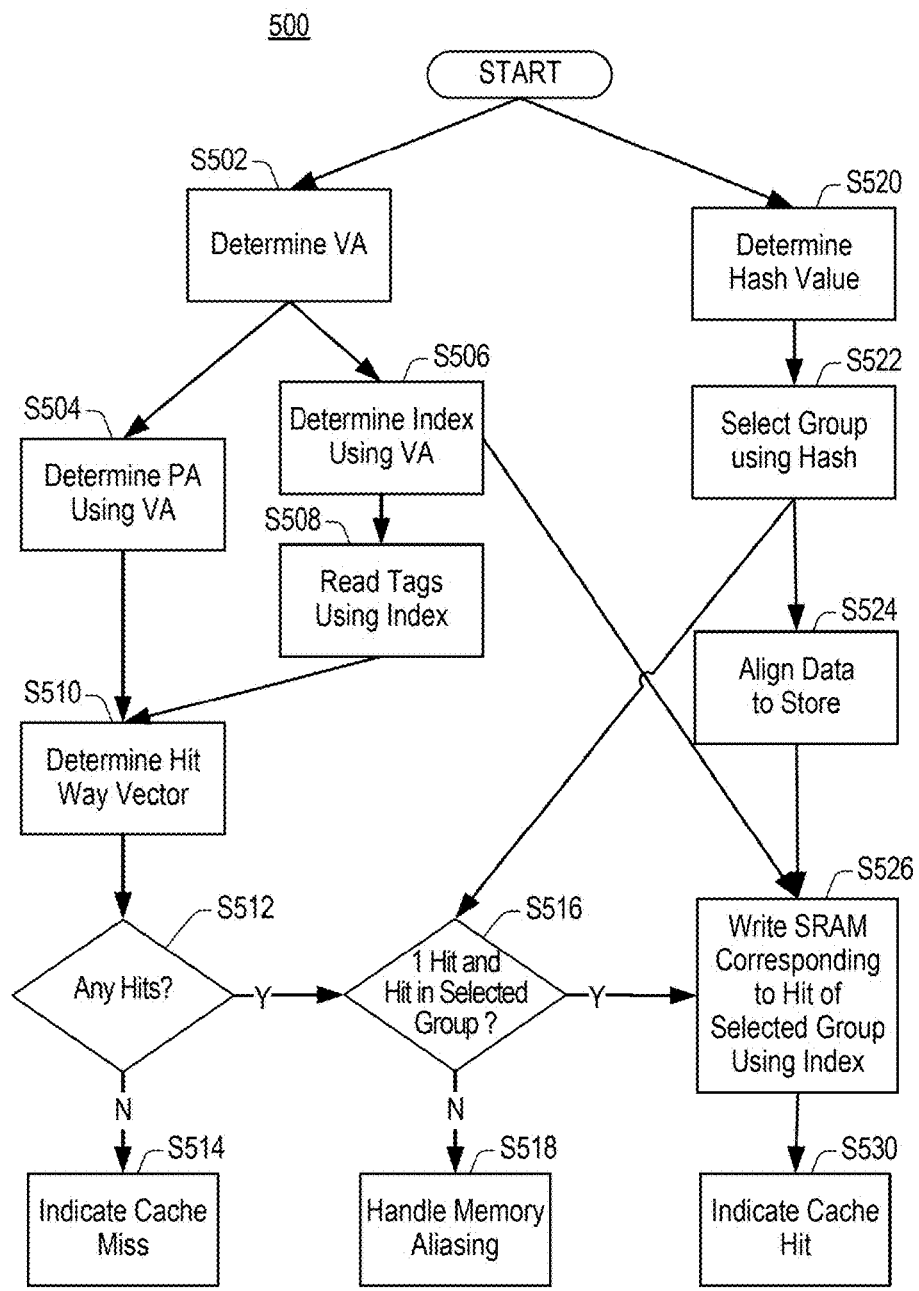
FIG. 5 illustrates a process for writing to a cache, according to an embodiment.

FIG. 5 illustrates a process 500 for writing to a parallel-access VIPT cache according to an embodiment. As shown in FIG. 5, some operations of the process 500 may be performed in parallel with other operations of the process 500. For example, operations of S520 to S526 may be performed in parallel with operations of S502 to S516, and operations of S506 and S508 may be performed in parallel with operation of S504.

At S502, the process 500 determines a Virtual Address (VA). The VA may be determined, for example, by adding a base address to an offset.

At S504, the process 500 determines a Physical Address (PA) using the VA. In an embodiment, the PA may determine from the VA using a Memory Management Unit (MMU). The MMU may include one or more of a Translation Look-aside Buffer (TLB) circuit, a page table tree walker circuit, and so on.

At S506, the process 500 determines an index using the VA. In an embodiment, the index may include a plurality of least significant bits (LSBs) of the VA.

At S508, the process 500 reads, using the index, a plurality of tag entries from a tag RAM. The tag entries respectively correspond to the ways of the cache. For example, when the cache has 8 ways, the process 500 reads 8 tag entries from the cache.

At S510, the process 500 determines a hit way vector using the PA and the plurality of tag entries. Bits of the hit way vector respectively corresponds to ways of the cache. In an embodiment, when a tag entry is indicated as valid and a tag value of the tag entry is equal to corresponding bits in the PA, the corresponding bit of the hit way vector is set to a predetermined hit value (for example, 1). Otherwise the corresponding bit of the hit way vector is set to a predetermined miss value (for example, 0).

At S512, the process 500 determines whether any of the bits of the hit way vector have the predetermined hit value. When at least one bit has the predetermined hit value, the process 500 proceeds to S516. Otherwise, at S512 the process 500 proceeds to S514.

At S514, the process 500 indicates the a cache miss has occurred.

In an embodiment, the process 500 may perform a fill process, such as the process 600 of FIG. 6, below, when a cache miss occurs. After performing the fill process, the process 500 may restart.

At S516, the process 500 determines whether memory aliasing has occurred. In an embodiment, memory aliasing occurs when a bit in the hit way vector corresponding to a way in a group other than the selected group (selected at S522) has the predetermined hit value, or when more than one bit in the hit way vector has the predetermined hit value. When only one bit of the hit way vector has the predetermined hit value and the one bit corresponds to a way that is in the selected group, memory aliasing has not occurred, and the process 500 proceeds to S526. Otherwise, at S516 the process 500 proceeds to S518.

At S518, the process 500 handles the memory aliasing. The process 500 may handle the memory aliasing using, for example, the process 900 of FIG. 9 or the process 1000 of FIG. 10, but embodiments are not limited thereto.

At S520, the process 500 determines a hash value. The hash value may be one of a plurality of values respectively corresponding to a group of ways of the cache. In an embodiment, the hash value is a function of the VA. In an embodiment, the hash value corresponds to a result of performing an exclusive-or (XOR) operation on a plurality of bits of the VA. In an embodiment, the bits of the VA are bits other than bits used in the index.

At S522, the process 500 selects a group using the hash value.

At S524, the process 500 aligns the data being stored, according to one or more bits of the PA or one or more bits of the VA, to produce aligned store data.

At S526, the process 500 writes the aligned store data into a portion of a cache line of a data SRAM of the selected group. The cache line may be selected using the index. The data SRAM corresponds a way of the cache having a corresponding bit in the hit way vector set to the predetermined hit value.

At S530, the process 500 indicates that a cache hit has occurred.

Figure 6:
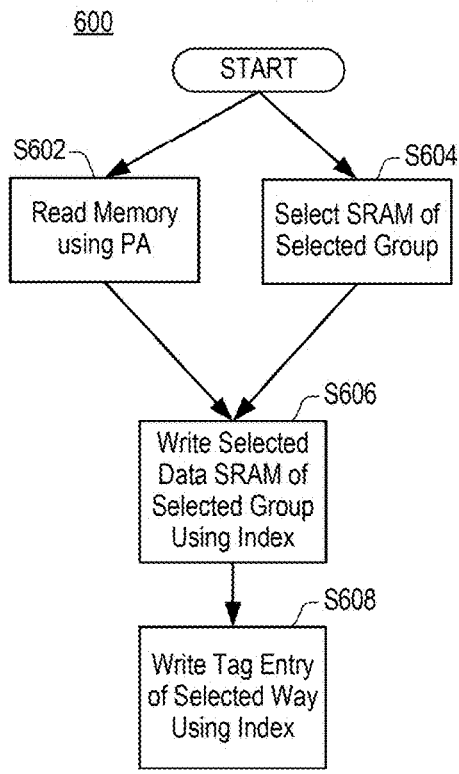
FIG. 6 illustrates a process for performing a fill operation, according to an embodiment.

FIG. 6 illustrates a process 600 for performing a fill operation according to an embodiment. As shown in FIG. 6, operations of S602 may be performed in parallel with operations of S604. The process 600 may use the VA, PA, index, and selected group determined by process 400 of FIG. 4 or by the process 500 of FIG. 5.

At S602, the process 600 reads information corresponding to the PA from a memory. In an embodiment, the memory may be a main memory or another cache.

At S604, the process 600 selects, using a replacement algorithm, a data SRAM of the selected group. For example, the process 600 may select as the selected data SRAM a data SRAM of the selected group having the least recently used (LRU) cache line of all the cache lines in the selected group that correspond to the index.

At S606, the process 600 stores the information read from the memory into a cache line corresponding to the index, the cache line being a cache line of the selected data SRAM of the selected group.

At S608, the process 600 write a tag entry corresponding to the selected data SRAM (which corresponds to a selected way) and corresponding to the index. The process 600 writes a tag corresponding to bits of the VA into the tag entry and sets a validity indicator of the tag entry to indicate that the tag is valid.

Figure 7:
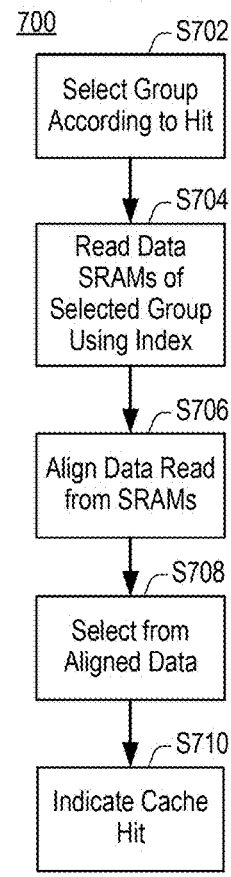
FIG. 7 illustrates a process for handling memory aliasing during a read operation, according to an embodiment.

FIG. 7 illustrates a process 700 for handling memory aliasing during a read operation according to an embodiment. The process 700 may use the hit way vector, index, and PA determined by the process 400 of FIG. 4.

At S702, the process 700 selects, as the selected group, the group that includes a way corresponding to a bit in the hit way vector that has the predetermined hit value.

At S704, the process 700 reads, using the index, cache lines from the data SRAMs of the selected group. In an embodiment, only a cache line from the data SRAM corresponding to the way having the bit in the hit way vector that has the predetermined hit value may be read.

At S706, the process 700 aligns, using one or more bits of the PA, the cache lines read out of the data SRAM(s) during S704 to produce aligned cache lines.

At S708, the process 700 selects, using the hit way vector, aligned data from among the aligned cache lines. The process 700 selects an aligned cache line corresponding to a bit of the hit way vector that has the predetermined hit value.

At S710, the process 700 indicates that a cache hit has occurred.

Figure 8:
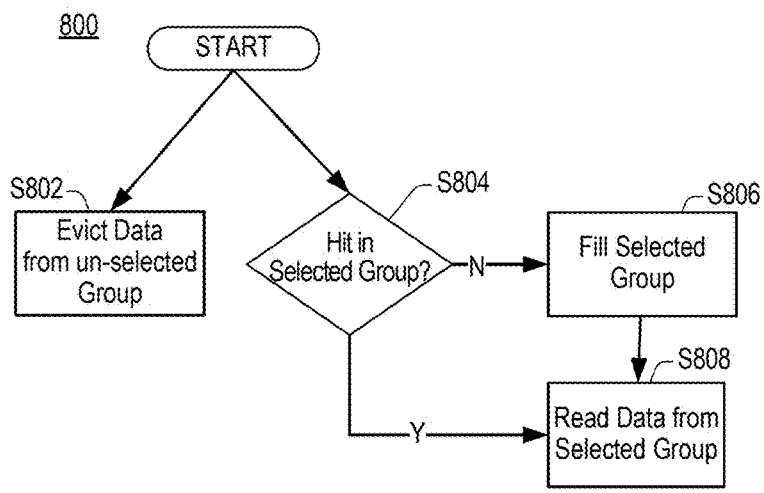
FIG. 8 illustrates a process for handling memory aliasing during a read operation, according to another embodiment.

FIG. 8 illustrates a process for handling memory aliasing during a read operation according to another embodiment. As shown in FIG. 8, operations of S802 may be performed in parallel with operations of S804 to S808. The process 800 may use the hit way vector, index, selected group, VA, and PA determined by the process 400 of FIG. 4.

At S802, the process 800 evicts the data residing in the cache line corresponding to the index of a data SRAM in a group other than the selected group (the un-selected group), the data SRAM of the un-selected group corresponding to a way corresponding to a bit in the hit way vector that has the predetermined hit value. For example, when a bit in the hit way vector that corresponds to way 2 of a group 1 has the predetermined hit value and a group 2 is the selected group, the process 800 evicts a cache line corresponding to the index in a second data SRAM (corresponding to way 2) of the group 1.

At S804, the process 800 determines whether there was a hit in the selected group. In an embodiment, the process 800 determines that there was a hit in the selected group when a bit in the hit way vector that corresponds to a way of the selected group has the predetermined hit value. When the process 800 determines that there was a hit in the selected group, the process 800 proceeds to S808. Otherwise, at S804 the process 800 proceeds to S806.

At S806, the process 800 performs a fill operation to place information associated with the PA in a cache line corresponding to the index in a data SRAM of the selected group. The fill operation may be performed using the process 600 of FIG. 6. When the fill operation is complete, the process 800 proceeds to S808.

At S808, the process 800 reads the data from the selected group. In an embodiment, the data is read using all or part of the process 400 of FIG. 4.

Figure 9:
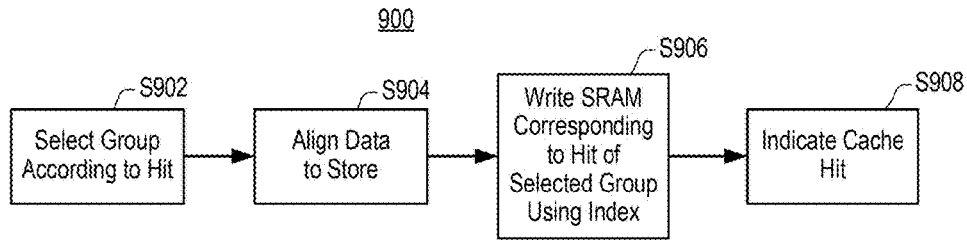
FIG. 9 illustrates a process for handling memory aliasing during a write operation, according to an embodiment.

FIG. 9 illustrates a process for handling memory aliasing during a write operation according to an embodiment. The process 900 may use the hit way vector, index, and PA determined by the process 500 of FIG. 5.

At S902, the process 900 selects, as the selected group, the group that includes a way corresponding to a bit in the hit way vector that has the predetermined hit value.

At S904, the process 900 aligns the data being stored, according to one or more bits of the PA or one or more bits of the VA, to produce aligned store data.

At S906, the process 900 writes the aligned store data into a portion of a cache line of a data SRAM of the selected group. The cache line may be selected using the index. The data SRAM corresponds to a way of the cache having a corresponding bit in the hit way vector set to the predetermined hit value.

At S908, the process 900 indicates that a cache hit has occurred.

Figure 10:
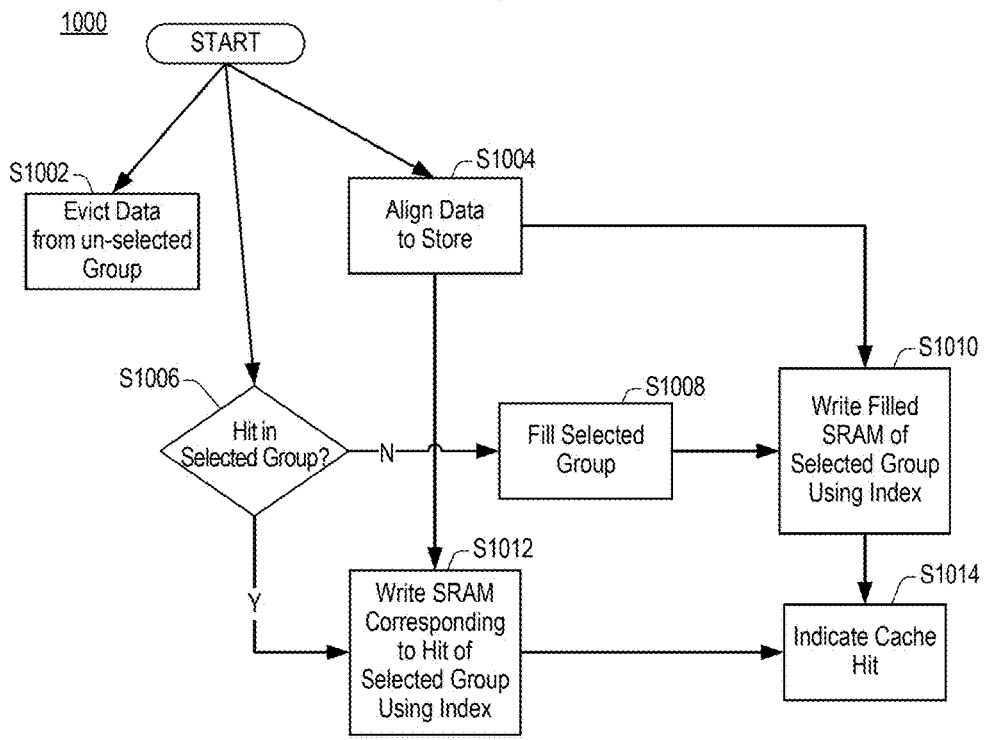
FIG. 10 illustrates a process for handling memory aliasing during a write operation, according to another embodiment.

FIG. 10 illustrates another process 1000 for handling memory aliasing during a write operation according to an embodiment. As shown in FIG. 10, operations of S1002 may be performed in parallel with operations of S1004 to S1014, and operations of S1004 may be performed in parallel with operations of S1002, S1006, and S1008. The process 1000 may use the hit way vector, index, selected group, VA, and PA determined by the process 500 of FIG. 5.

At S1002, the process 1000 evicts the data residing in the cache line corresponding to the index of a data SRAM in a group other than the selected group (the un-selected group), the data SRAM of the un-selected group corresponding to a way corresponding to a bit in the hit way vector that has the predetermined hit value. For example, when a bit in the hit way vector that corresponds to way 2 of a group 1 has the predetermined hit value and a group 2 is the selected group, the process 1000 evicts a cache line corresponding to the index in a second data SRAM (corresponding to way 2) of the group 1.

At S1004, the process 1000 aligns the data being stored, according to one or more bits of the PA or one or more bits of the VA, to produce aligned store data.

At S1006, the process 1000 determines whether there was a hit in the selected group. In an embodiment, the process 1000 determines that there was a hit in the selected group when a bit in the hit way vector that corresponds to a way of the selected group has the predetermined hit value. When the process 1000 determines that there was a hit in the selected group, the process 1000 proceeds to S1012. Otherwise, at S1006 the process 1000 proceeds to S1008.

At S1008, the process 1000 performs a fill operation to place information associated with the PA in a cache line corresponding to the index in a data SRAM of the selected group. The fill operation may be performed using the process 1000 of FIG. 6.

At S1010, the process 1000 writes the aligned store data into a portion of a cache line of a data SRAM of the selected group that was filled in S1008. The cache line may be selected using the index. The data SRAM corresponds a way of the cache having a corresponding bit in the hit way vector set to the predetermined hit value.

At S1012, the process 1000 writes the aligned store data into a portion of a cache line of a data SRAM of the selected group. The cache line may be selected using the index. The data SRAM corresponds to a way of the cache having a corresponding bit in the hit way vector set to the predetermined hit value.

At S1014, the process 1000 indicates that a cache hit has occurred.

Figure 11:
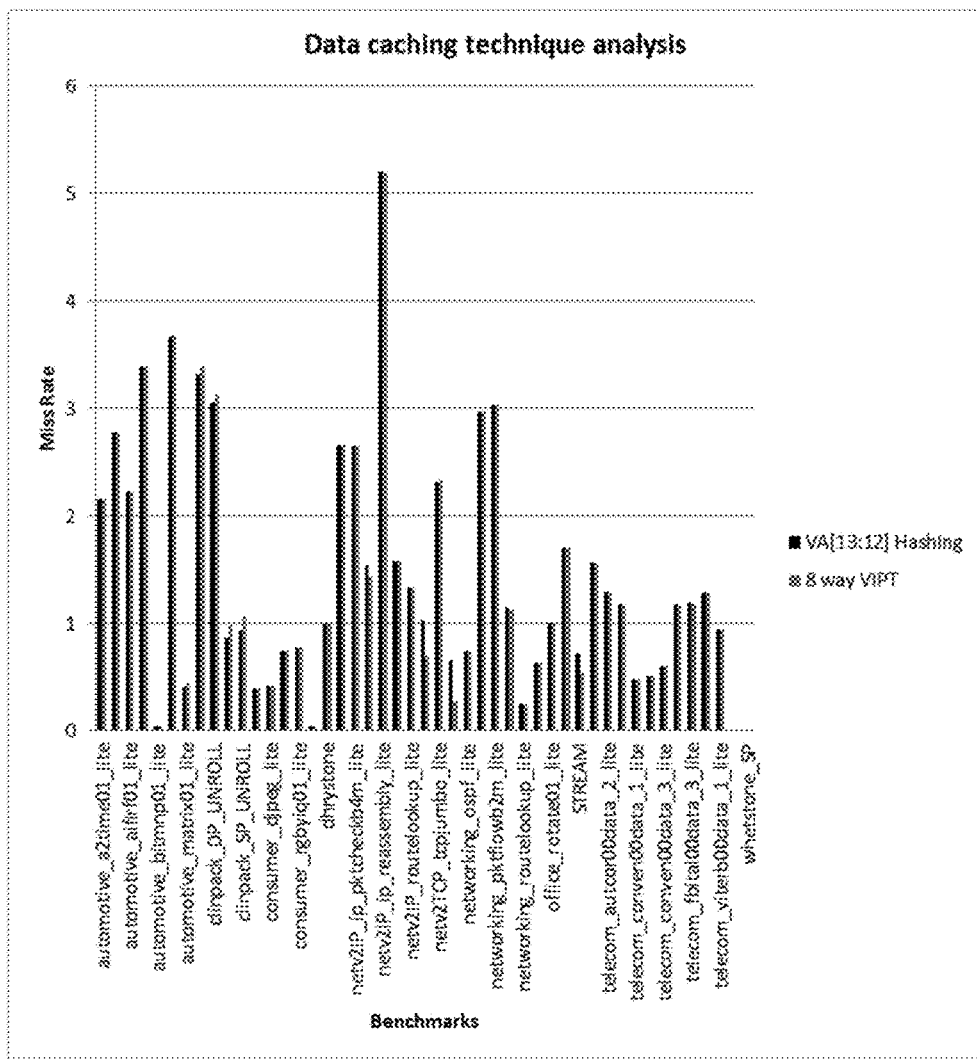
FIG. 11 shows miss rates for benchmarks occurring during a simulation of a VIPT cache according to an embodiment.

FIG. 11 shows results of experiments performed using various benchmarks using cache simulator to determine the impact on data hit rate of an embodiment. The experiments were performed using a model of a 32 KB VIPT data cache having a minimum page size of 4 KB (that is, that used 12 bits (bits 11 to 0) of a Virtual Address for indexing) and having 8 ways.

Black bars indicate a miss rate in percent when the ways of the 32 KB VIPT data cache were not partitioned into groups. Gray bars indicate a miss rate when the ways of the 32 KB VIPT data cache were partitioned into two groups each having four ways, wherein a hash function selects a group according to bits 13 and 12 of the Virtual Address.

FIG. 11 illustrates that the embodiment of the 32 KB VIPT data cache using the hash function to select a group of ways has a similar hit rate to the 32 KB VIPT data cache that did not partition the ways into groups.

Further aspects of the present disclosure relate to one or more of the following clauses.

In an embodiment, a circuit comprises an address generation circuit to produce a virtual address and an index signal, and a cache circuit. The cache circuit has a plurality of ways, and includes a plurality of Random Access Memory (RAM) groups and a hash function circuit to generate a hash output signal according to the virtual address. Each RAM group includes a plurality of RAMs which respectively correspond to the ways of the cache. The cache circuit is configured to i) select, using a value of the hash output signal, a selected RAM group of the plurality of RAM groups, and ii) perform, using a value of the index signal as an address, an operation using one or more of the RAMs of the selected RAM group.

In an embodiment, the circuit further comprises an address translation circuit to produce a physical address corresponding to the virtual address, and the cache circuit further comprises a tag RAM configured to produce, using the value of the index signal as the address, a plurality of tag entries, and a hit determination circuit to produce a hit indication signal by comparing tags of the plurality of tag entries, respectively, to the physical address. The tag entries respectively include tags and validity indications of the ways of the cache. The hit indication signal indicates ways that have valid tags that respectively match the physical address.

In an embodiment wherein the operation is a read operation, the cache circuit is to perform the read operation using all of the RAMs of the selected RAM group and using none of the RAMs of RAM groups that were not selected using the value of the hash output signal, and the cache circuit further comprises a multiplexer circuit to select, according to the hit indications, output data from data read from the RAMs of the selected RAM group in the read operation.

In an embodiment, the address translation circuit includes a Translation Look-aside Buffer (TLB).

In an embodiment, when the hit indication signal indicates that a way corresponding to a RAM of a RAM group other than the selected RAM group has a valid tag that matches the physical address, the cache circuit determines that memory aliasing has occurred.

In an embodiment, when the hit indication signal indicates that more than one way has a valid tag that matches the physical address, the cache circuit determines that memory aliasing has occurred.

In an embodiment, when the cache circuit determines that memory aliasing has occurred, the cache circuit is to evict information from a RAM of a RAM group that was not selected using the value of the hash output signal.

In an embodiment, when the cache circuit determines that memory aliasing has occurred, the cache circuit performs the operation using one or more RAMs of a RAM group that was not selected using the value of the hash output signal.

In an embodiment, the hash function circuit generates the hash output signal by using an exclusive-or (XOR) circuit to perform an XOR operation on a plurality of bits of the virtual address.

In an embodiment, a method performed for controlling a cache circuit including a plurality of ways comprises i) determining, using a hash function circuit, a hash value corresponding to a virtual address, ii) selecting, using the hash value, a selected RAM group from a plurality of RAM groups, each RAM group including a plurality of RAMs, and iii) performing an operation by using one or more RAMs of the selected RAM group. The RAMs of the RAM groups respectively correspond to the ways.

In an embodiment, the method further comprises translating the virtual address into a physical address, determining whether the ways respectively hit the physical address, respectively, and performing the operation according to the determination of whether the ways hit the physical address.

In an embodiment, the ways respectively hit the physical address when respective tags of the ways are valid and respectively match the physical address.

In an embodiment, the method further comprises determining that memory aliasing has occurred when more than one of the ways hit the physical address.

In an embodiment, the method further comprises determining that memory aliasing has occurred when a way corresponding to a RAM of a RAM group that was not selected hits the physical address.

In an embodiment, the method further comprises performing a fill operation to a RAM of the selected RAM group when none of the ways hit the physical address.

In an embodiment, the operation is a read operation, and performing the read operation comprises reading information from all of the RAMs of the selected RAM group, and selecting information from the information read from the RAMs according to the determination of whether the ways respectively hit the physical address.

In an embodiment, the method further comprises performing the read operation without reading information from any of RAMs of RAM groups that were not selected.

In an embodiment, the method further comprises when a way corresponding to a RAM of a RAM group that was not selected hits the physical address, evicting information from the RAM of the RAM group that was not selected.

In an embodiment, the operation is a write operation, and the method further comprises i) when a way corresponding to a RAM of the selected RAM group hits the physical address, writing information into the RAM of the selected RAM group; and ii) when a way corresponding to a RAM of a RAM group that was not selected hits the physical address, evicting information from the RAM of the selected RAM group.

In an embodiment, the operation is a write operation, and the method further comprises i) when a way corresponding to a RAM of the selected RAM group hits the physical address, writing information into the RAM of the selected RAM group; and ii) when a way corresponding to a RAM of a RAM group that was not selected hits the physical address, writing information into the RAM of the RAM group that was not selected.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A circuit comprising:
   an address generation circuit to produce a virtual address and an index signal; and
   a cache circuit, the cache circuit having a plurality of ways, the cache circuit comprising:
      a plurality of Random Access Memory (RAM) groups, each RAM group including a plurality of RAMs, and
      a hash function circuit to generate a hash output signal according to the virtual address,
   wherein the RAMs of the of the RAM groups respectively correspond to the ways of the cache, and
   wherein the cache circuit is configured to i) select, using a value of the hash output signal, a selected RAM group of the plurality of RAM groups, and ii) perform, using a value of the index signal as an address, an operation using one or more of the RAMs of the selected RAM group.

2. The circuit of claim 1, further comprising:
   an address translation circuit to produce a physical address corresponding to the virtual address,
   wherein the cache circuit further comprises:
      a tag RAM to produce, using the value of the index signal as the address, a plurality of tag entries, the tag entries respectively including tags and validity indications of the ways of the cache; and
      a hit determination circuit to produce a hit indication signal by comparing tags of the plurality of tag entries, respectively, to the physical address, wherein the hit indication signal indicates ways that have valid tags that respectively match the physical address.

3. The circuit of claim 2, wherein the operation is a read operation,
   wherein the cache circuit is configured to perform the read operation using all of the RAMs of the selected RAM group and using none of the RAMs of RAM groups that were not selected using the value of the hash output signal, and
   wherein the cache circuit further comprises a multiplexer circuit to select, according to the hit indications, output data from data read from the RAMs of the selected RAM group in the read operation.

4. The circuit of claim 2, wherein the address translation circuit includes a Translation Look-aside Buffer (TLB).

5. The circuit of claim 2, wherein when the hit indication signal indicates that a way corresponding to a RAM of a RAM group other than the selected RAM group has a valid tag that matches the physical address, the cache circuit determines that memory aliasing has occurred.

6. The circuit of claim 2, wherein when the hit indication signal indicates that more than one way has a valid tag that matches the physical address, the cache circuit determines that memory aliasing has occurred.

7. The circuit of claim 2, wherein when the cache circuit determines that memory aliasing has occurred, the cache circuit is to evict information from a RAM of a RAM group that was not selected using the value of the hash output signal.

8. The circuit of claim 2, wherein when the cache circuit determines that memory aliasing has occurred, the cache circuit performs the operation using one or more RAMs of a RAM group that was not selected using the value of the hash output signal.

9. The circuit of claim 1, wherein the hash function circuit generates the hash output signal by using an exclusive-or (XOR) circuit to perform an XOR operation on a plurality of bits of the virtual address.

10. A method performed for controlling a cache circuit including a plurality of ways, the method comprising:
    determining, using a hash function circuit, a hash value corresponding to a virtual address;
    selecting, using the hash value, a selected RAM group from a plurality of RAM groups, each RAM group including a plurality of RAMs; and
    performing an operation by using one or more RAMs of the selected RAM group,
    wherein the RAMs of the RAM groups respectively correspond to the ways.

11. The method of claim 10, further comprising:
    translating the virtual address into a physical address;
    determining whether the ways respectively hit the physical address, respectively; and
    performing the operation according to the determination of whether the ways hit the physical address.

12. The method of claim 11, wherein the ways respectively hit the physical address when respective tags of the ways are valid and respectively match the physical address.

13. The method of claim 11, further comprising determining that memory aliasing has occurred when more than one of the ways hit the physical address.

14. The method of claim 11, further comprising determining that memory aliasing has occurred when a way corresponding to a RAM of a RAM group that was not selected hits the physical address.

15. The method of claim 11, further comprising performing a fill operation to a RAM of the selected RAM group when none of the ways hit the physical address.

16. The method of claim 11, wherein the operation is a read operation, and wherein performing the read operation comprises:
    reading information from all of the RAMS of the selected RAM group; and
    selecting information from the information read from the RAMS according to the determination of whether the ways respectively hit the physical address.

17. The method of claim 16, further comprising:
    performing the read operation without reading information from any of RAMS of RAM groups that were not selected.

18. The method of claim 16, further comprising:
    when a way corresponding to a RAM of a RAM group that was not selected hits the physical address, evicting information from the RAM of the RAM group that was not selected.

19. The method of claim 11, wherein the operation is a write operation, and wherein the method further comprises:
    when a way corresponding to a RAM of the selected RAM group hits the physical address, writing information into the RAM of the selected RAM group; and when a way corresponding to a RAM of a RAM group that was not selected hits the physical address, evicting information from the RAM of the selected RAM group.

20. The method of claim 11, wherein the operation is a write operation, and wherein the method further comprises:
when a way corresponding to a RAM of the selected RAM group hits the physical address, writing information into the RAM of the selected RAM group; and
when a way corresponding to a RAM of a RAM group that was not selected hits the physical address, writing information into the RAM of the RAM group that was not selected.

\* \* \* \* \*